(12) United States Patent
Nishimura (10) Patent No.: US 8,730,487 B2
(45) Date of Patent: May 20, 2014

(54) MULTIFUNCTION DEVICE CONFIGURED FOR EXECUTING PROCESSES ACCORDING TO EXECUTION REQUEST INFORMATION FROM AN EXTERNAL MEMORY DEVICE

(75) Inventor: Akira Nishimura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1159 days.

(21) Appl. No.: 11/677,131

(22) Filed: Feb. 21, 2007

(65) Prior Publication Data

US 2007/0211281 A1   Sep. 13, 2007

(30) Foreign Application Priority Data

Mar. 13, 2006 (JP) .................................. 2006-066920

(51) Int. Cl.
*G06F 3/12* (2006.01)

(52) U.S. Cl.
USPC ......... 358/1.13; 358/1.19; 358/1.15; 358/501

(58) Field of Classification Search
CPC .......... H04N 1/00355; H04N 1/00358; H04N 1/00366; H04N 1/00368; H04N 1/00376; H04N 1/00379; H04N 1/00761; H04N 1/00968
USPC ........................ 358/1.16; 369/30.04; 711/115
See application file for complete search history.

(56) References Cited

U.S. PATENT DOCUMENTS

| | | | | |
|---|---|---|---|---|
| 2003/0184803 A1* | 10/2003 | Yamada et al. | ............... | 358/1.16 |
| 2004/0194010 A1* | 9/2004 | Kirihara et al. | ............... | 715/500 |
| 2005/0162686 A1* | 7/2005 | Barrus | ........................ | 358/1.15 |
| 2005/0174614 A1* | 8/2005 | Sugaya et al. | ................ | 358/487 |
| 2006/0227376 A1* | 10/2006 | Kinoshita | .................... | 358/1.16 |
| 2007/0285719 A1* | 12/2007 | Kobayashi et al. | .......... | 358/1.16 |

FOREIGN PATENT DOCUMENTS

JP     2001-157011     6/2001

* cited by examiner

*Primary Examiner* — Benny Q Tieu
*Assistant Examiner* — Marcellus Augustin
(74) *Attorney, Agent, or Firm* — Rabin & Berdo, P.C.

(57) ABSTRACT

A multifunction device includes a memory reading unit for reading file information in a memory, a selecting unit for selecting an executable function based on said file information, a printing unit for printing out on a printing medium information bringing said file information into correspondence with said executable function, a medium scanning unit for scanning the printing medium, a detecting unit for detecting the file information requested for execution and the executable information from among information scanned out with the medium scanning unit, and an executing unit for executing a process corresponding to the executable function to a file corresponding to the file information based on the information detected with the detecting unit.

16 Claims, 12 Drawing Sheets

| | PRINT | FAX | E-MAIL |
|---|---|---|---|
| ▇ DIRECTORY 1 | | | |
| ☐ FILE 1. txt | ☐ | ☐ | ☐ |
| ☐ FILE 2. doc | | | ☐ |
| ▇ DIRECTORY 2 | | | |
| ▇ DIRECTORY 2_A | | | |
| ☐ FILE a. doc | | | ☐ |
| ▇ DIRECTORY 2_B | | | |
| ☐ FILE A. txt | ☐ | ☐ | ☐ |
| ☐ FILE B. pdf | ☐ | | ☐ |
| ☐ FILE C. pdf | ☐ | | ☐ |
| ☐ FILE 3. xls | | | ☐ |
| ☐ FILE 4. xls | | | ☐ |
| ▇ DIRECTORY 2 | | | |
| ☐ FILE 5. doc | | | ☐ |

| PRINT | FAX RECEIVER | E-MAIL |
|---|---|---|
| | | |

|  | PRINT | FAX | E-MAIL |
|---|---|---|---|
| ■ DIRECTORY 1 |  |  |  |
| ☐ FILE 1. txt | ■ | ☐ | ☐ |
| ☐ FILE 2. doc |  |  | ☐ |
| ■ DIRECTORY 2 |  |  |  |
| ■ DIRECTORY 2_A |  |  |  |
| ☐ FILE a. doc |  |  | ☐ |
| ■ DIRECTORY 2_B |  |  |  |
| ☐ FILE A. txt | ☐ | ■ | ☐ |
| ☐ FILE B. pdf | ☐ |  | ☐ |
| ☐ FILE C. pdf | ☐ |  | ☐ |
| ☐ FILE 3. xls |  |  | ■ |
| ☐ FILE 4. xls |  |  | ■ |
| ■ DIRECTORY 2 |  |  |  |
| ☐ FILE 5. doc |  |  | ■ |

| PRINT | FAX RECEIVER | E-MAIL |
|---|---|---|
|  | 03-1234-5678 | testmailer@abc.com |

MULTIFUNCTION DEVICE CONFIGURED FOR EXECUTING PROCESSES ACCORDING TO EXECUTION REQUEST INFORMATION FROM AN EXTERNAL MEMORY DEVICE

BACKGROUND OF THE INVENTION

1. Field of the Invention

This invention relates to a multifunction device furnished with an image input and output function.

2. Description of Related Art

Where a memory such as a memory card is incorporated in a conventional multifunction device furnished with functions of a printer, a facsimile machine, a copying machine, and the like, the multifunction device displays a list of files stored in the memory on a screen of a display unit to allow an operator to choose a desired file from among those files. Where the operator chooses the file and requests printing, the multifunction device reads the information on the chosen file out of the memory to execute printing (see, e.g., Japanese Patent Laid-Open Publication No. 2001-157011).

The conventional multifunction device as described above, however, is operated by choosing each function such as printing, facsimile transmission, and other various functions according to the information on the file which was displayed and chosen on the screen of the display unit, so that each of those functions cannot be executed in the case of using a low-cost device without the display unit. Even with the display unit, the operation becomes complicated where the number of files stored in the memory is large and the screen is so small that only several lines can be displayed.

This invention is intended to solve the problems in the conventional multifunction device and to provide a low-cost, easily operable multifunction device, which prints on a printing medium the information that the file information inside the memory corresponds to the executable function to detect and execute the file information, whose execution is requested by reading the printing medium, and the executable function, thereby enabling execution of each of the various functions without use of the display unit, resulting in simplification or omission of the display unit.

SUMMARY OF THE INVENTION

To accomplish the foregoing objects, a multifunction device according to this invention includes a memory reading unit for reading file information in a memory, a selecting unit for selecting an executable function based on said file information, a printing unit for printing out on a printing medium information bringing said file information into correspondence with said executable function, a medium scanning unit for scanning the printing medium, a detecting unit for detecting the file information requested for execution and the executable information from among information scanned out with the medium scanning unit, and an executing unit for executing a process corresponding to the executable function to a file corresponding to the file information based on the information detected with the detecting unit.

The multifunction device according to this invention prints the information that the file information inside the memory corresponds to the executable function to detect and execute the file information, whose execution is requested by reading the printing medium, and the executable function. Therefore, each of various functions can be executed without use of the display unit, thereby enabling simplification or omission of the display unit, resulting in a low-cost device operated with easy operation.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein.

DESCRIPTION OF PREFERRED EMBODIMENTS

Hereinafter, embodiments of this invention will be explained in detail with reference to drawings.

Figure 2:
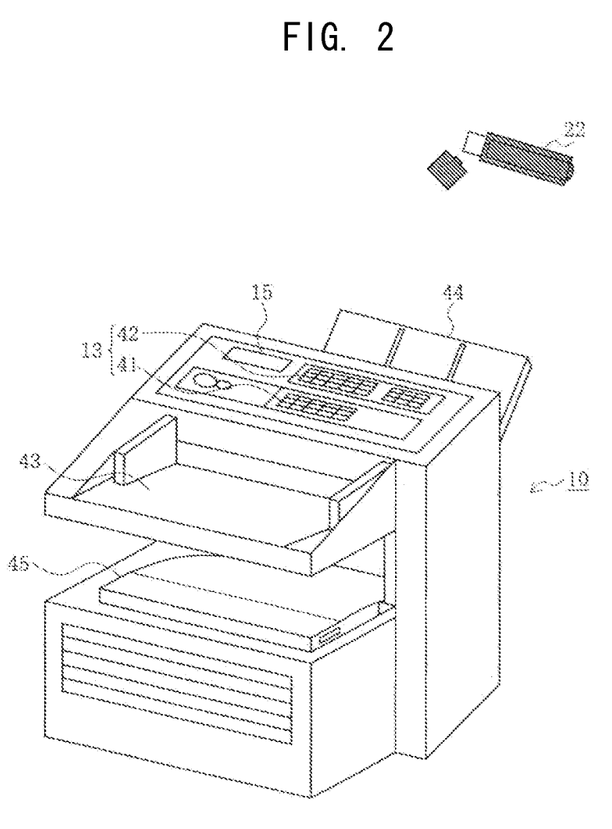
FIG. 2 is an external perspective view of a multifunction device according to the first embodiment of this invention.

FIG. 2 is an external perspective view of a multifunction device according to the first embodiment of this invention.

In FIG. 2, numeral 10 is a multifunction device according to this invention, which is defined as a device having combined functions of an image scanning apparatus (a scanner), a printer, a facsimile machine, a copying machine, and the like, and is connected to a network, not shown. This network may be any type such as a wireless or wired private communication network, a public communication network, the internet, a LAN (Local Area Network), or a WAN (Wide Area Network) as long as e-mails and facsimile data can be sent and received therethrough.

The multifunction device 10 has an operation unit operated by an operator. The operation unit has a display unit 15, which includes a CRT, a liquid crystal display, an LED (Light Emitting Diode) display, and the like and displays various conditions of the multifunction device 10 and the stored data contents, and an input unit 13, which includes a switch 41, a one-touch key 42, and the like and enables input of a telephone number, e-mail address, and the like by input of figures, alphabets, and the like.

The multifunction device 10 has a scanning-paper tray 43 used for setting an operational paper as a printing medium to be scanned with an after-mentioned paper scanning unit 12, a scanned-paper discharging tray 44 for discharging the operational paper having been scanned, and a paper discharging tray 45 for discharging the operational paper having been printed with an after-mentioned printing unit 14, and the like.

Furthermore, the multifunction device 10 has a memory slot, not shown, which is connected to an external memory 22 as a memory. The external memory 22 is memory such as a USB memory, a memory stick (R), and a memory card, but may be any types of detachable storage means.

A structure of the multifunction device 10 is next explained from the viewpoint of function.

Figure 1:
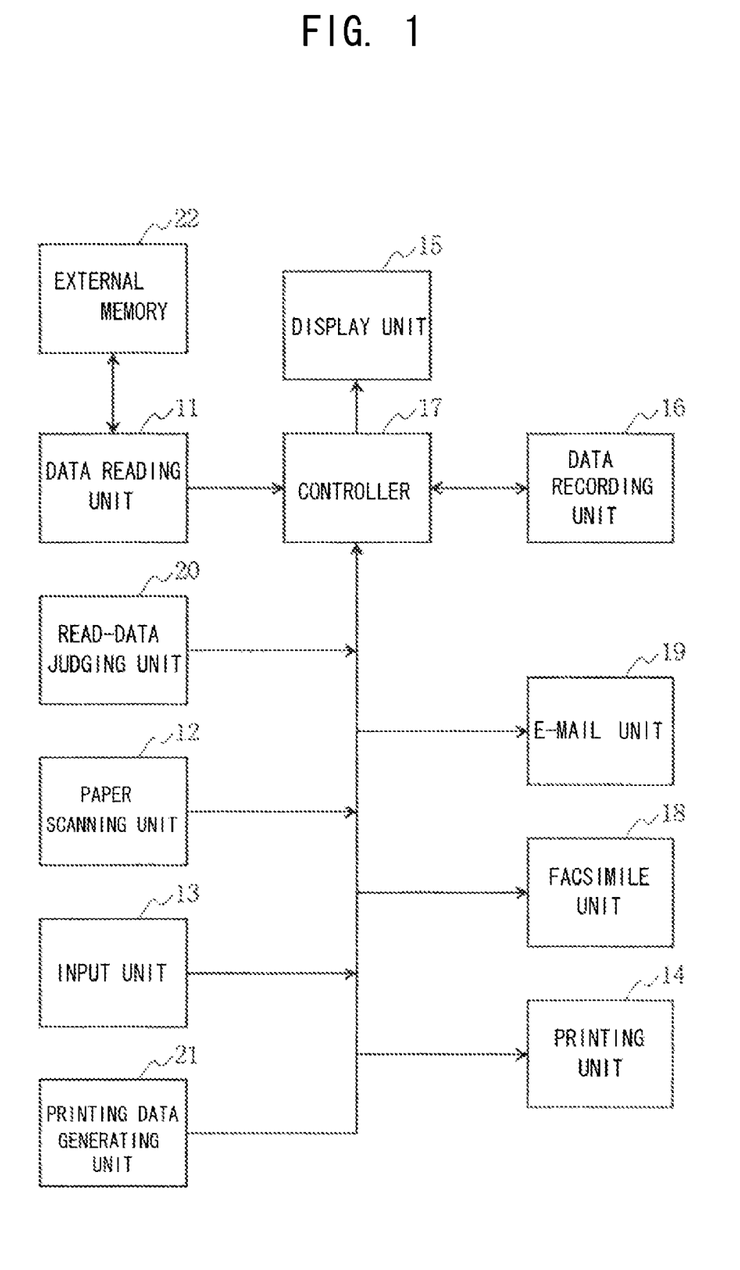
FIG. 1 is a block diagram showing a functional structure of a multifunction device according to a first embodiment of this invention.

FIG. 1 is a block diagram showing a functional structure of a multifunction device according to the first embodiment of the present invention.

In FIG. 1, numeral 11 is a data reading unit serving as a memory reading unit that reads the data as file information stored in the external memory 22 connected to the multifunction device 10. Numeral 12 is a paper scanning unit serving as a medium scanning unit having a scanner function for scanning the contents of the printed paper such as an operational paper. Numeral 14 is a printing unit having a printing function for printing the stored data. Numeral 16 is a data recording unit for recording the data having been read and scanned by the data reading unit 11 and the paper scanning unit 12. The data recorded with the data recording unit 16 can be printed by the printing unit 14 and can also be displayed on the display unit 15.

Numeral 20 is a read-data judging unit for making a judgment as to whether the data has been read and scanned by the data reading unit 11 and the paper scanning unit 12. Numeral 21 is a printing data generating unit for generating printing data used in printing by the printing unit 14.

Numeral 18 is a facsimile unit serving as a facsimile machine that transmits and receives facsimile data. Numeral 19 is an e-mail unit having a function for transmitting and receiving emails. Numeral 17 is a controller for completely controlling operation of the multifunction device 10. All of the units are connected to the controller 17 and controlled by the controller 17.

Explained next is operation of the multifunction device 10 with the structure as described above. First, operation for printing the operational paper is explained.

Figure 3:
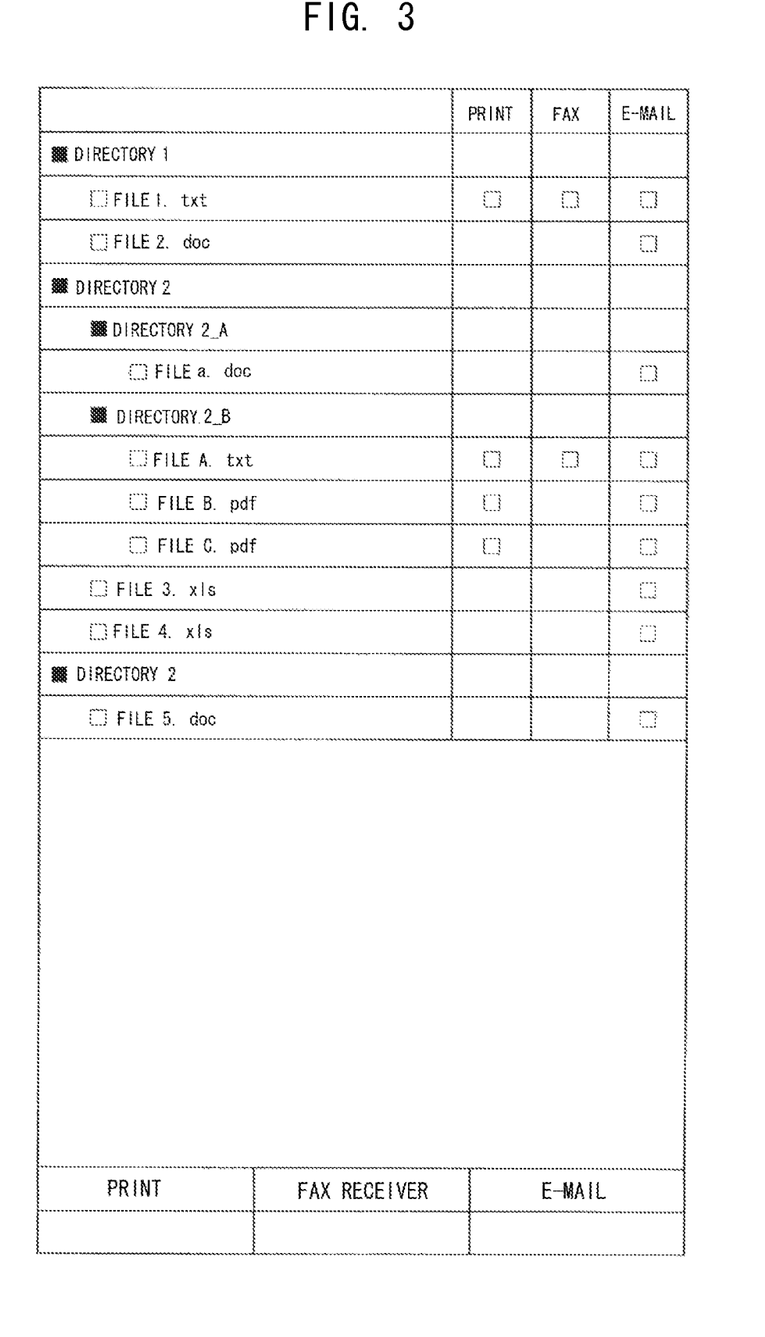
FIG. 3 is a view showing an example of operational paper printed with the multifunction device according to the first embodiment of this invention.
Figure 4:
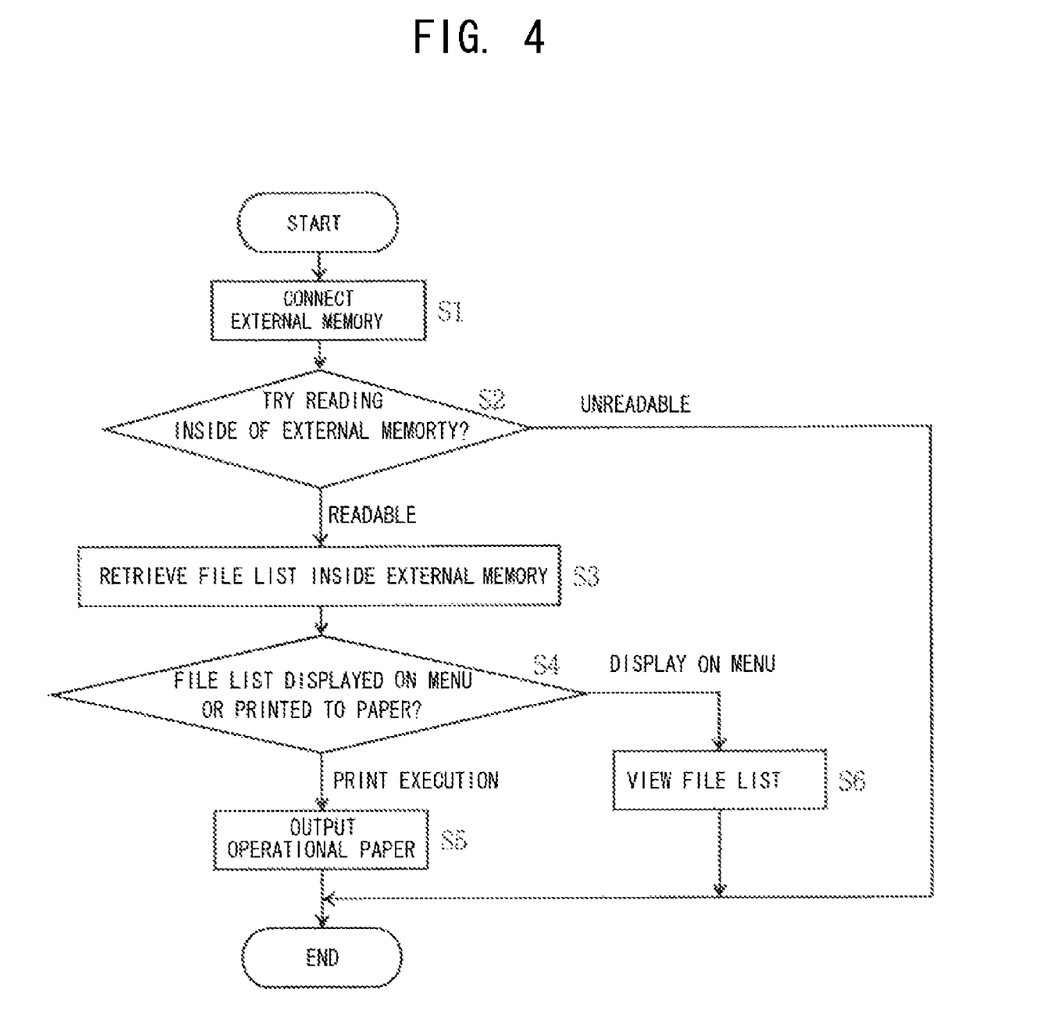
FIG. 4 is a flow chart showing operation of the multifunction device, for printing the operational paper according to the first embodiment of this invention.

FIG. 3 is a view showing an example of the operational paper printed with the multifunction device according to the first embodiment of this invention. FIG. 4 is a flow chart showing operation of the multifunction device, for printing the operational paper according to the first embodiment of this invention.

First, where the operator connects the external memory 22 to the multifunction device 10, the multifunction device 10 detects that the external memory 22 is connected thereto. The data reading unit 11 then tries reading the data inside the connected external memory 22, so that the controller 17 makes a judgment as to whether the data are readable with the multifunction device 10.

In the case of connecting to the equipment not having the readable data, that is, the case of unreadable data, the multifunction device 10 terminates the process without subsequent operation. Furthermore, in the case of connecting to the equipment having the readable data, that is, the case of the readable data, a file list inside the external memory 22 is retrieved, so that the data recording unit 16 records and holds the data having been read by the data reading unit 11. At this time, where the data have a hierarchical structure, the data recording unit 16 holds the data by making a distinction between a directory and a file.

The display unit 15 then displays a message urging the operator to choose whether to display the file list to a menu or to print it on the paper. The display unit 15 is then on standby until the operator operates the input unit 13 to choose whether to display to the display unit 15 the file list having been retrieved from the external memory 22 or to output it from the printing unit 14. Herein, where the operator chooses the menu display only, that is, the operator chooses only to display the file list to the display unit 15, the file list displayed on the display unit 15 is viewed, and the process is terminated.

In the case where the operator chooses execution of printing, that is, where the operator chooses printing of the file list to the paper, the printing unit 14 prints the data held by the data recording unit 16, that is, the file list, to the paper to output the operational paper, thereby terminating the process.

As shown in FIG. 3, on the operational paper to be printed, the file list held by the data recording unit 16 is provided with blank spaces corresponding to the executable processes, which are distinguished based on an extension provided to each of the files. The printing data generating unit 21 produces blank spaces in the "FAX" column for the data such as *.prn, *.pdf, *.txt, which can be transmitted via facsimile by a discrete device while producing blank spaces in the "E-MAIL" column for all of the other data attachable to e-mail.

A flow chart will be explained next. The external memory 22 is connected at the step S1. A judgment is made at the step S2 as to whether reading trial of the data inside the external memory 22 is possible or not. Where the reading trial of the data inside the external memory 22 is possible, the operation goes to the step 3. Where the reading trial of the data inside the external memory 22 is impossible, this process is terminated. The file list held inside the external memory 22 is retrieved at the step S3. A judgment is made at the step S4 as to whether the file list is displayed on the menu or printed to the paper. Where the file list is displayed on the menu, the operation goes to the step S6. Where the file list is printed to the paper, the operation goes to the step S5. The operational paper is output and this process is terminated at the step S5. The file list is viewed and this process is terminated at the step S6.

Operation for scanning the operational paper will be explained next.

Figure 5:
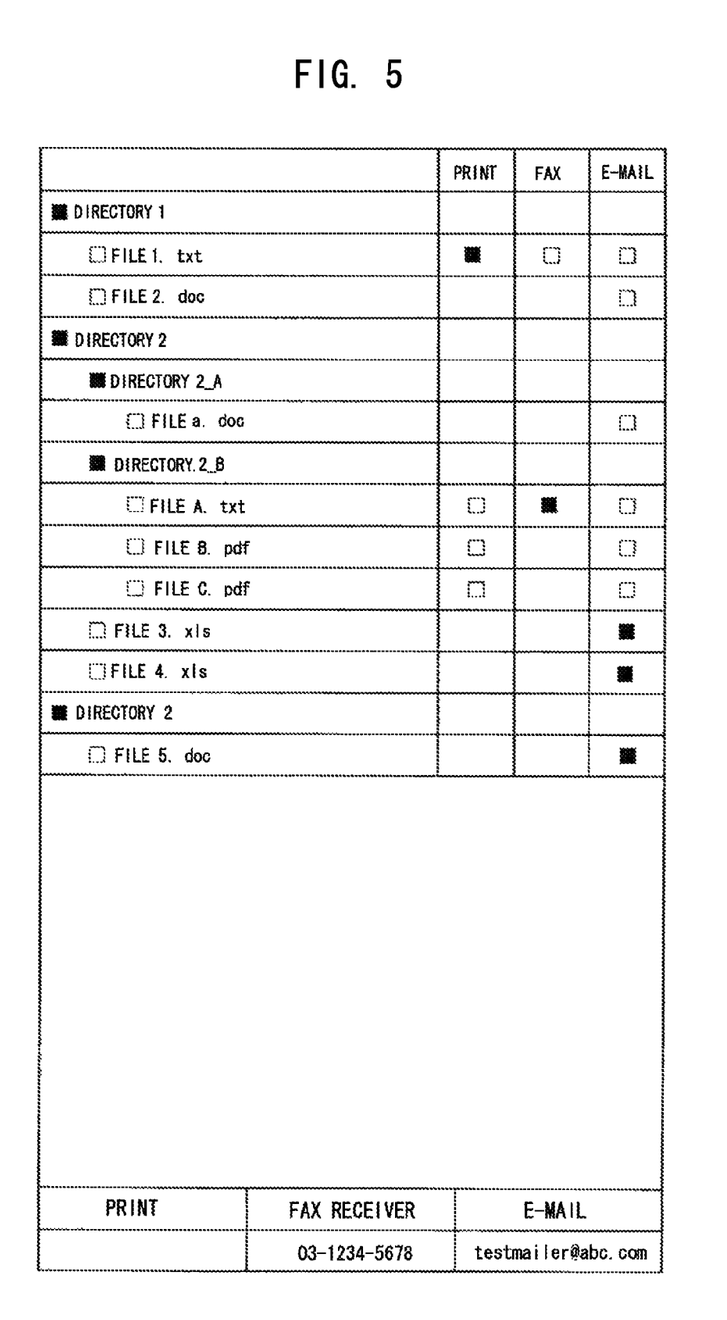
FIG. 5 is a view showing an example of filling out the operational paper according to the first embodiment of this invention.
Figure 6:
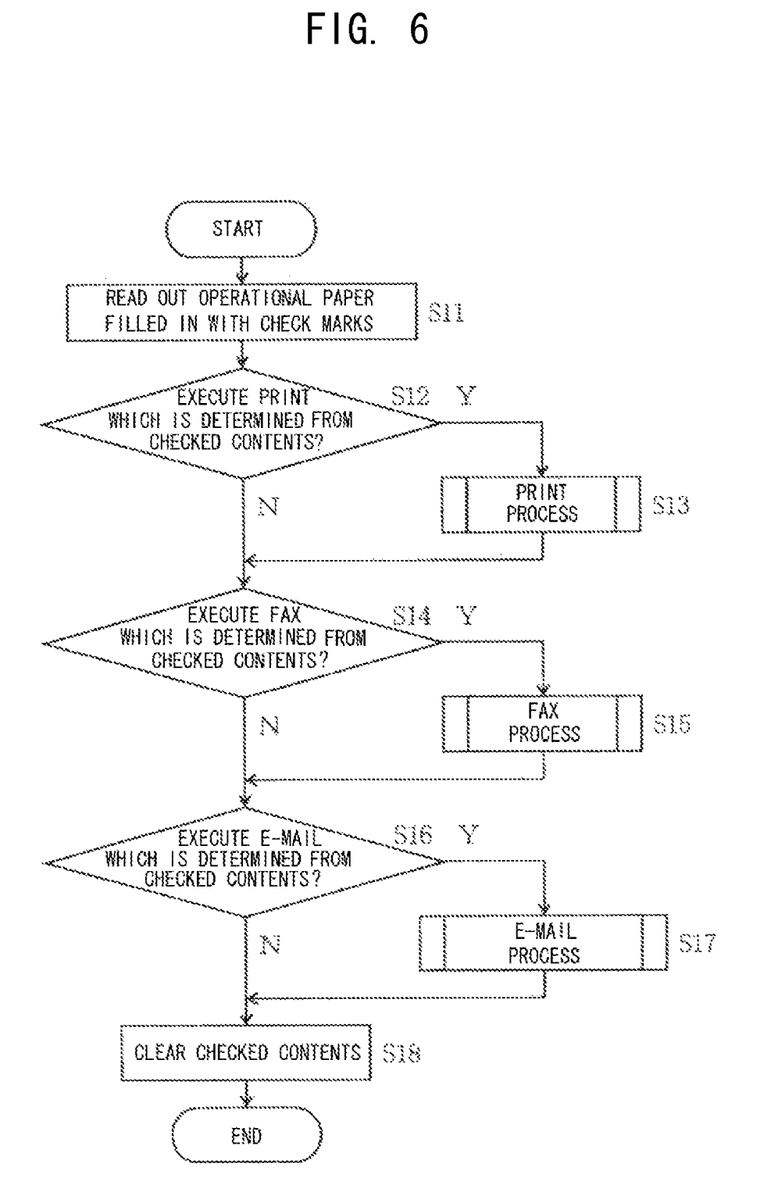
FIG. 6 is a flow chart showing an operation of the multifunction device, for scanning the operational paper of the multifunction device according to the first embodiment of this invention.

FIG. 5 is a view showing an example of filling-in of the operational paper according to the first embodiment of this invention. FIG. 6 is a flow chart showing operation of the multifunction device for scanning the operational paper of the multifunction device according to the first embodiment of this invention.

The operator assigns check marks to the blank spaces printed on the operational paper, corresponding to the desired executable function (printing, facsimile transmission, and e-mail transmission in an example case shown in FIG. 5) concerning the desired file information. In the case of demand for the facsimile transmission, the operator fills in a facsimile receiver field with a facsimile number of the other party. In the case of demand for the e-mail transmission, the operator fills in an e-mail receiver field with an e-mail address of the other party.

Next, as shown in FIG. 5, where the operator sets the operational paper filled in with the check marks on the paper-scanning tray 43, the paper scanning unit 12 scans the aforementioned operational paper, that is, the operational paper filled in with check marks. The controller 17 then makes a comparison using coordinate information, between the information on the paper having been scanned with the paper scanning unit 12 and the image information inside the data recording unit 16 created at the time of printing of the operational paper. In the case of detecting a clear difference therebetween, the controller 17 judges that the difference results from the filled in check marks, thereby holding the corresponding file name and information. In the case of demand for the facsimile or e-mail transmission, a character recognizing unit recognizes characters filled in each receiver field. Subsequently, the read-data judging unit 20 makes a judgment as to columns of "PRINT", "FAX", and "E-MAIL" in sequence, based on this information.

To be more precise, a judgment is made as to whether "PRINT", which is determined from the checked contents, is executed or not, and the printing process is performed in the case where "PRINT" is checked. A judgment is then made as to whether "FAX", which is determined from the checked contents, is executed or not, and the facsimile process is performed in the case where "FAX" is checked. A judgment is then made as to whether "E-MAIL", which is determined from the checked content, is executed or not, and the e-mail process is performed in the case where "E-Mail" is checked. Finally, the checked contents are canceled, and this process is terminated.

A flow chart will be explained next. The operational paper filled in with the check marks is scanned at the step S11. A judgment is made at the step S12 as to whether the printing, which is determined from the checked contents, is executed or not. In the case of executing the printing determined from the checked contents, the operation goes to the step S13. In the case of not executing the printing determined from the checked contents, the operation goes to the step S14. The printing process is executed at the step S13. A judgment is made at the step S14 as to whether the facsimile process, which is determined from the checked contents, is performed. In the case of performing the facsimile process determined from the checked contents, the operation goes to the step S15. In the case of not performing the facsimile process determined from the checked contents, the operation goes to the step S16. The facsimile process is executed at the step S15. A judgment is made at the step S16 as to whether the e-mail process, which is determined from the checked contents, is performed. In the case of performing the e-mail process, the operation goes to the step S17. In the case of not performing the e-mail process, the operation goes to the step S18. The e-mail process is executed at the step S17. The checked contents are cleared, and this process is terminated.

Explained next is a subroutine in the printing process at the step S13 in FIG. 6.

Figure 7:
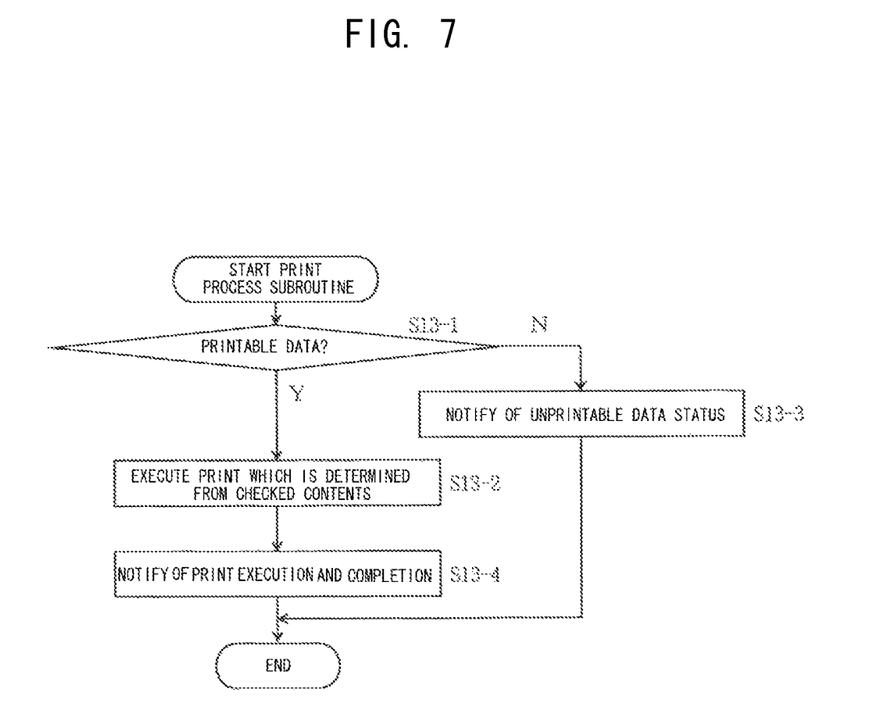
FIG. 7 is a flow chart showing a subroutine in a printing process according to the first embodiment of this invention.

FIG. 7 is a flow chart showing the subroutine for a printing process according to the first embodiment of this invention.

Where a check mark in the "PRINT" column is detected to start the printing process, the data reading unit 11 reads out the corresponding file with respect to the marked file, so that a judgment is made through the controller 17 as to whether the data are printable or not. In the case of the printable data, the data having been read are transmitted to the printing unit 14 in sequence. The printing unit 14 executes the printing, which is determined from the checked contents. The display unit 15 is notified of execution and completion of the printing, and the process is terminated. In the case of nonprintable data, the display unit 15 is notified of the nonprintable data status, and this process is terminated.

A flow chart will be explained next.

A judgment is made at the step S13-1 as to whether the data are printable or not from the file list. In the case of printable data, the operation goes to the step S13-2. In the case of nonprintable data, the operation goes to the step S13-3. The printing, which is determined from the checked contents, is executed at the step S13-2. Notification of the nonprintable data status is made at the step S13-3. The printing is executed while notification of the completion of the printing is made to terminate the process at the step S13-4.

Explained next is a subroutine in the facsimile process in the step S15 in FIG. 6.

Figure 8:
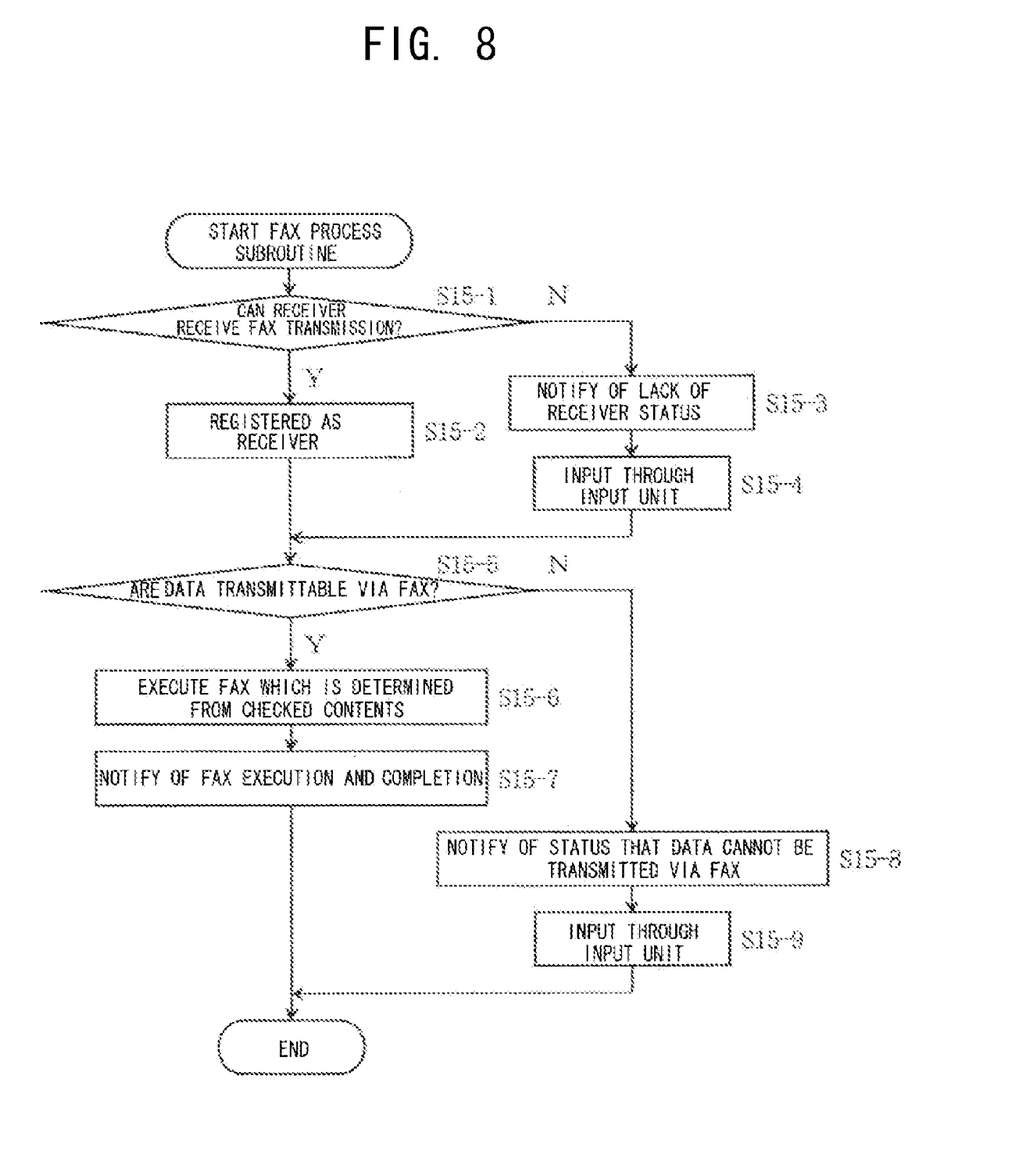
FIG. 8 is a flow chart showing a subroutine in a facsimile transmission process according to the first embodiment of this invention.

FIG. 8 is a flow chart showing the subroutine in the facsimile transmission process according to the first embodiment of this invention.

Where the check mark in the column of "FAX" is detected to start the facsimile process, the data reading unit 11 reads the facsimile receiver field on the operational paper, so that a judgment is made through the controller 17 as to whether the receiver can receive facsimile transmission or not. For example, the controller 17 judges that the receiver cannot receive facsimile transmission in the case where a telephone number is not filled in or is unreadable. Where the receiver can receive facsimile transmission, the content in the facsimile receiver field is registered as a receiver. Where the receiver cannot receive facsimile transmission, the display unit 15 is notified of a lack of a receiver, so that the operation is on standby until input is made by the operator through the input unit 13.

The data reading unit 11 subsequently makes a judgment as to whether the data are transmittable via facsimile or not. In the case of data transmittable by facsimile, the read data are transmitted to the facsimile unit 18. The facsimile unit 18 then executes facsimile transmission, which is determined by the checked contents. The display unit 15 is notified of execution and completion of the facsimile transmission, and this process is terminated. In the case of data that is not transmittable by facsimile, the display unit 15 is notified of that the data cannot be transmitted by facsimile, the operation is on standby until input is made by the operator through the input unit 13, and this process is terminated.

Explained next is a flow chart.

A judgment is made at the step S15-1 as to whether the receiver can receive facsimile transmission or not. Where the receiver can receive facsimile transmission, the operation goes to the step S15-2. Where the receiver cannot receive facsimile transmission, the operation goes to the step S15-3. The content in the facsimile receiver field is registered as a receiver at the step S15-2. Notification of the lack of a receiver is made at the step S15-3. The operator inputs a receiver through the input unit 13 at the step S15-4. A judgment is made at the step S15-5 as to whether the data are transmittable via facsimile or not. In the case of data transmittable by facsimile, the operation goes to the step S15-6. In the case of data that is not transmittable by facsimile, the operation goes to the step S15-8. The facsimile process, which is judged from the checked contents, is performed at the step S15-6. The facsimile process is performed while notification of the completion of the facsimile process is made, and this process is terminated at the step S15-7. Notification that the data cannot be transmitted by facsimile is made at the step S15-8. The operator inputs the data through the input unit 13, and this process is terminated at the step S15-9.

Next explained is a subroutine in the e-mail process at the step S17 in FIG. 6.

Figure 9:
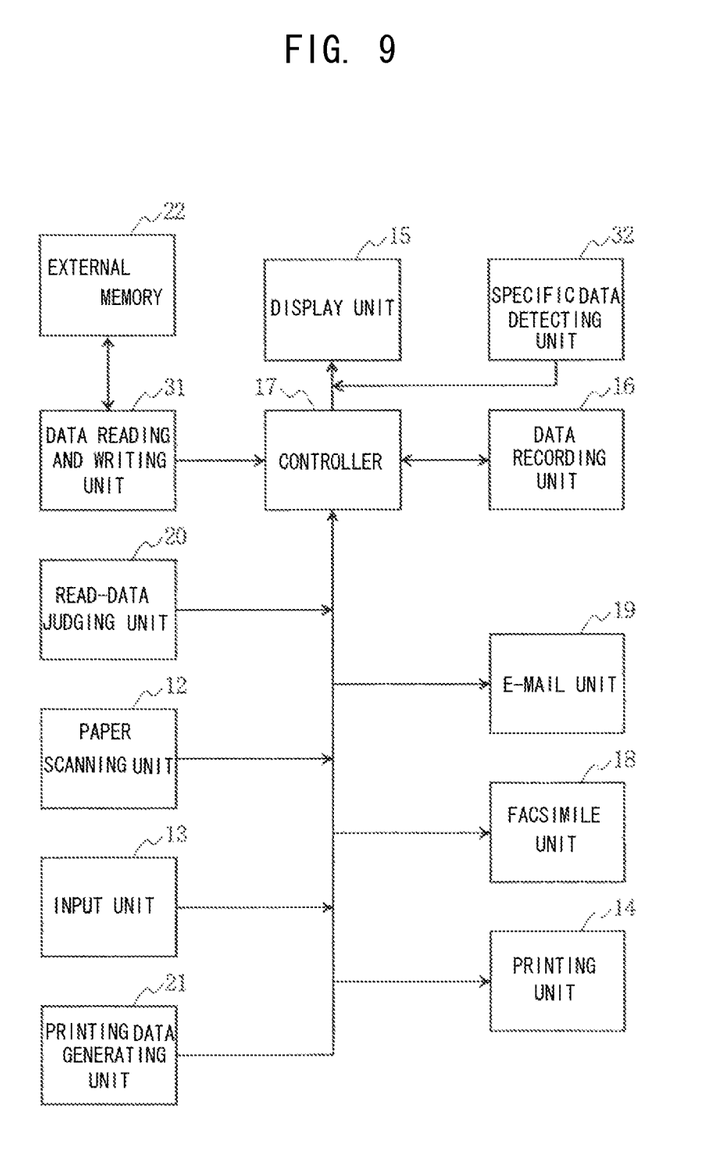
FIG. 9 is a flow chart showing a subroutine in an e-mail process according to the first embodiment of this invention.

FIG. 9 is a flow chart showing the subroutine in the e-mail process according to the first embodiment of this invention.

Where a check mark in the "E-MAIL" column is detected to start the e-mail process, the data reading unit 11 reads the e-mail receiver field on the operational paper, so that a judgment is made through the controller 17 as to whether the receiver can receive the e-mail transmission or not. For example, the controller 17 judges that the receiver cannot receive the e-mail transmission in the case where an e-mail address is not filled in or is unreadable. Where the receiver can receive the e-mail transmission, the content in the e-mail receiver field is registered as a receiver. Where the receiver cannot receive the e-mail transmission, the display unit 15 is notified of a lack of a receiver, so that the operation is on standby until input is made by the operator through the input unit 13.

The controller 17 retrieves the corresponding file from the data reading unit 11, thereby producing and transmitting the e-mail attached with this file to the e-mail unit 19. Then the e-mail unit 19 executes the e-mail transmission, which is determined by the checked contents, and this process is terminated.

Next explained is a flow chart.

A judgment is made at the step S17-1 as to whether the receiver can receive the e-mail transmission or not. Where the receiver can receive the e-mail transmission, the operation goes to the step S17-2. Where the receiver cannot receive the e-mail transmission, the operation goes to the step S17-3. The content in the e-mail receiver field is registered as a receiver at the step S17-2. Notification of the lack of a receiver is made at the step S17-3. The operator inputs the receiver through the input unit 13 at the step S17-4. The e-mail unit 19 executes the e-mail transmission, which is determined by the checked contents, and this process is terminated at the step S17-5.

As described above, the information that the file information in the external memory 22 corresponds to the executable function is printed to the paper and outputs the operational paper, thereby detecting and executing the file information, whose execution is requested by scanning the operational paper filled in with the check marks, and the executable function. Therefore, each of the various functions can be executed without use of display unit 15, thereby enabling simplification or omission of the display unit 15.

A second embodiment will be explained next. It is to be noted that the elements having substantially the same structures as those in the first embodiment are assigned with the same reference numbers so that those duplicated descriptions are omitted, and descriptions for the same operations and effects as those in the first embodiment are also omitted.

Figure 10:
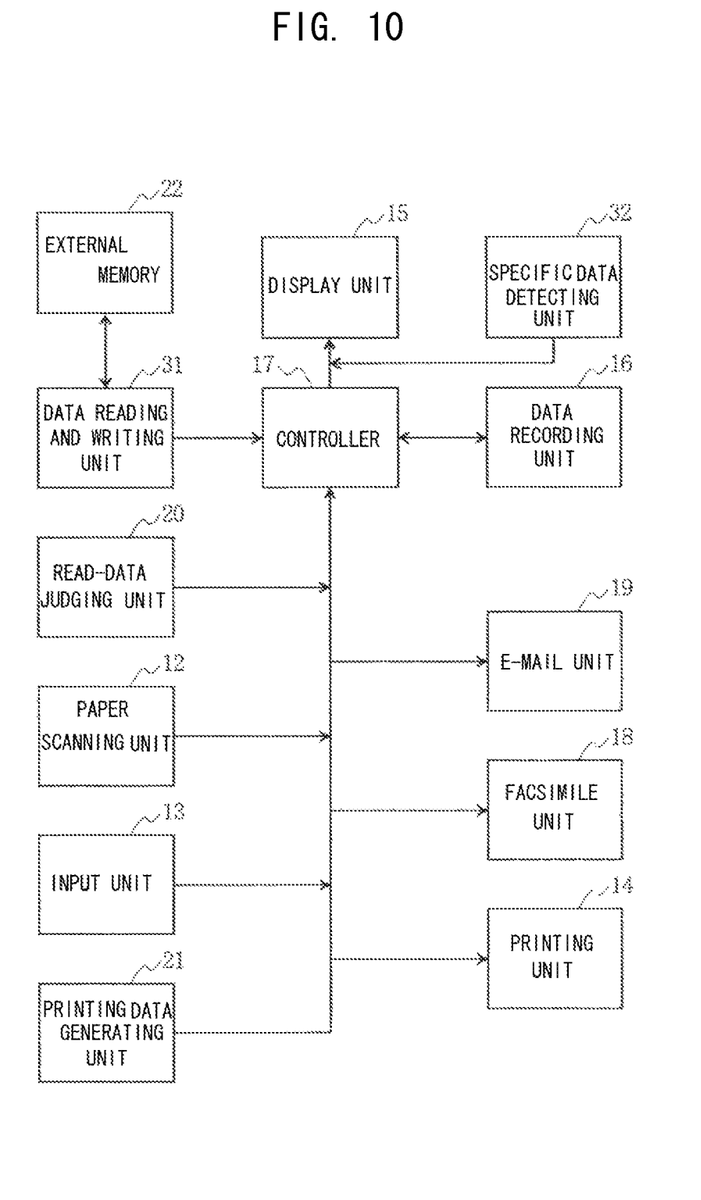
FIG. 10 is a block diagram showing a functional structure of a multifunction device according to a second embodiment of this invention.

FIG. 10 is a block diagram showing a functional structure of the multifunction device according to the second embodiment of this invention.

In this embodiment, the multifunction device 10 has a data reading and writing unit 31 serving as a memory reading unit and as a memory writing unit, and a specific file detecting unit 32. The data reading and writing unit 31 reads the data stored in the external memory 22 connected to the multifunction device 10, and writes the data in the external memory 22. The specific file detecting unit 32 detects existence of the specific file which has been already designated. It is to be noted that the other structures are substantially the same as those in the first embodiment, so that the duplicated explanations are omitted.

Next explained is operation of the multifunction device 10 in this embodiment. First, operation for printing the operational paper is explained.

First, where the operator connects the external memory 22 to the multifunction device 10, the multifunction device 10 detects that the external memory 22 is connected thereto. The data reading and writing unit 31 then tries reading the data inside the connected external memory 22, so that the controller 17 makes a judgment as to whether the data is readable by the multifunction device 10.

In the case of connecting to the equipment not having the readable data, that is, the case of unreadable data, the multifunction device 10 terminates the process without subsequent operation. Furthermore, in the case of connecting to the equipment having the readable data, that is, the case of readable data, the file list inside the external memory 22 is retrieved, so that the data recording unit 16 records and holds the data having been read by the data reading unit 11. At this time, where the data have a hierarchical structure, the data recording unit 16 holds the data by making a distinction between a directory and a file.

Next, the display unit 15 displays a message urging the operator to choose whether to display the file list to a menu or to print it to the paper. The display unit 15 is then on standby until the operator operates the input unit 13 to choose whether to display to the display unit 15 the file list having been retrieved from the external memory or to output it from the printing unit 14. Herein, where the operator chooses the menu display only, that is, the operator chooses only to display the file list to the display unit 15, the display unit 15 displays the file list, and the process is terminated.

Where the operator chooses execution of printing, that is, where the operator chooses printing of the file list to the paper, the printing unit 14 prints the data held by the data recording unit 16, that is, the file list, to the paper and outputs the operational paper, thereby terminating the process.

As shown in FIG. 3, on the operational paper to be printed, the file list held by the data recording unit 16 is provided with blank spaces corresponding to the executable processes, which are distinguished based on an extension provided to each of the files. The printing data generating unit 21 produces blank spaces in the "FAX" column for the data such as *.prn, *.pdf, *.txt, which can be transmitted via facsimile by a discrete device while producing the blank spaces in the "E-MAIL" column for of the other data attachable to e-mail.

Explained next is operation for scanning the operational paper.

Figure 11:
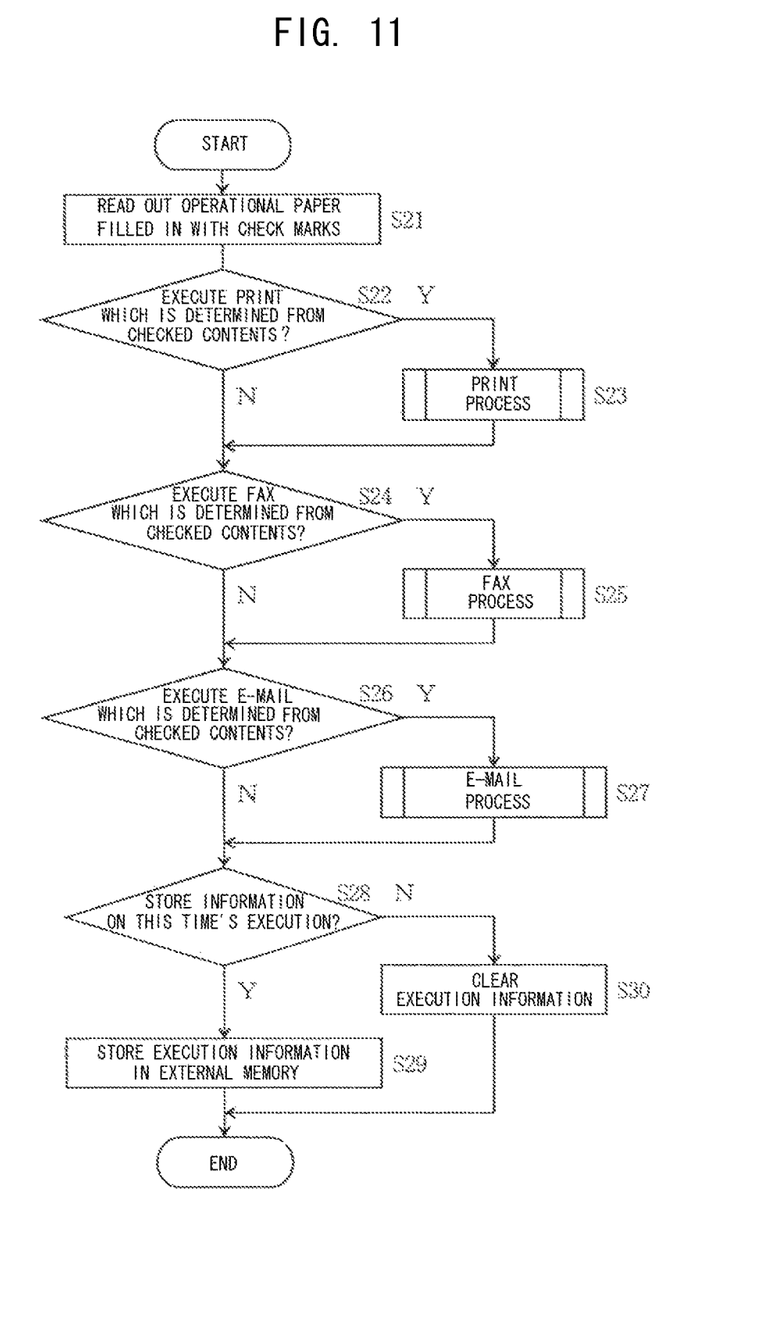
FIG. 11 is a flow chart showing operation of the multifunction device, for scanning operational paper according to the second embodiment of this invention.

FIG. 11 is a flow chart showing operation of the multifunction device, for scanning the operational paper according to the second embodiment of this invention.

The operator assigns a check mark to the blank space which is printed on the operational paper, with respect to the desired executable function concerning the desired file information. In the case of demand for the facsimile transmission, the operator fills out the facsimile receiver field with a facsimile number of the other entry. In the case of demand for the e-mail transmission, the operator fills out the e-mail receiver field with the e-mail address of the other entry.

Next, as shown in FIG. 5, where the operator sets the operational paper filled in with the check marks on the paper-scanning tray 43, the paper scanning unit 12 scans the aforementioned operational paper, that is, the operational paper filled in with the check marks. The controller 17 then makes a comparison using coordinate information, between the information the paper having been scanned with the paper scanning unit 12 and the image information inside the data recording unit 16 created at the time of printing of the operational paper. In the case of detecting a clear difference therebetween, the controller 17 judges that the difference results from the in check marks, thereby holding the corresponding file name and information. In the case of demand for the facsimile or e-mail transmission, the character recognizing unit recognizes characters filled in each receiver field. Subsequently, the read-data judging unit 20 makes a judgment as to columns of "PRINT", "FAX", and "E-MAIL" in sequence, based on the information as described above.

To be more precise, a judgment is made as to whether "PRINT", which is determined from the checked contents, is executed or not, and the printing process is performed in the case where "PRINT" is checked. A judgment is then made as to whether "FAX", which is determined from the checked contents, is executed or not, and the facsimile process is performed in the case where "FAX" is checked. A judgment is then made as to whether "E-MAIL", which is determined from the checked content, is executed or not, and the e-mail process is performed in the case where "E-Mail" is checked. Finally, the checked contents are canceled, and this process is terminated.

Where the data reading unit 31 cannot read out the data, the display unit 15 is notified of the data unreadable status.

A judgment is then made as to whether "FAX", which is determined from the checked contents, is executed or not, and the facsimile process is performed in the case where "FAX" is checked. Upon initiation of the facsimile process, the data reading and writing unit 31 reads out the facsimile receiver field on the operational paper, so that a judgment is made through the controller 17 as to whether the receiver can receive facsimile transmission or not. Where the receiver can receive facsimile transmission, the content in the facsimile receiver filed is registered as a receiver. Where the receiver cannot receive facsimile transmission, the display unit 15 is notified of a lack of a receiver, so that the operation is on standby until input is made by the operator through the input unit 13.

The data reading and writing unit 31 then makes a judgment as to whether the data can be transmitted via facsimile or not. In the case of data transmittable by facsimile, the read data are transmitted to the facsimile unit 18. The facsimile unit 18 then executes facsimile transmission, which is determined by the checked contents. The display unit 15 is notified of execution and completion of the facsimile transmission. In the case of data that is not transmittable by facsimile, the display unit 15 is notified of that the data cannot be transmitted by facsimile.

Next, a judgment is made as to whether "E-MAIL", which is determined from the checked contents, is executed or not, and the e-mail process is performed in the case where "E-MAIL" is checked. Upon start of the e-mail process, the data reading and writing unit 31 reads out the e-mail receiver field in the operational paper, so that a judgment is made though the controller 17 as to whether the receiver can receive e-mail transmission or not. For example, the controller 17 judges that the receiver cannot receive the e-mail transmission in the case where an e-mail address is not filled in or is unreadable. Where the receiver can receive the e-mail transmission, the content in the e-mail receiver field are registered as a receiver. Where the receiver cannot receive the e-mail transmission, the display unit 15 is notified of a lack of a receiver, so that the operation is on standby until input is made by the operator through the input unit 13.

Subsequently, the controller 17 retrieves the corresponding file from the data reading and writing unit 31, thereby producing and transmitting the e-mail attached with this file to the e-mail unit 19. The e-mail unit 19 then executes the e-mail transmission.

The operator is then asked as to whether the information on this time's execution, which was made through the sequential operation as described above, is to be stored or not. Where the operator chooses to store the information, the data reading and writing unit 31 stores the execution information in the external memory 22 through the controller 17, thereby terminating this process. In this case, the data stored in the external memory 22 are stored as a file with a specific name (exeproccess.txt) in which characters such as file 1.txt: print, file A. text: FAX, . . . , FAX No.: 03-1234-5678, E-MAIL: testmailer@abc.com, are stored. Where the operator chooses not to store the data, the execution information is deleted and this process is terminated.

A flowchart will be explained next.

The filled in operational paper is scanned at the step S21. A judgment is made at the step S22 as to whether the printing, which is determined from the checked contents, is executed or not. In the case of executing the printing determined from the checked contents, the operation goes to the step S23. In the case of not executing the printing determined from the checked contents, the operation goes to the step S24. The printing process is performed at the step S23. A judgment is made at the step S24 as to whether the facsimile process, which is determined from the checked contents, is performed or not. In the case of performing the facsimile process determined from the checked contents, the operation goes to the step S25. In the case of not performing the facsimile process determined from the checked contents, the operation goes to the step S26. The facsimile process is performed at the step S25. A judgment is made at the step S26 as to whether the e-mail process, which is determined from the checked contents, is made or not. In the case of performing the e-mail process, the operation goes to the step S27. In the case of not performing the e-mail process, the operation goes to the step S28. The e-mail process is performed at the step S27. A judgment is made at the step S28 as to whether the information on this time's execution is to be stored or not. In the case of storing the information on this time's execution, the operation goes to the step S29. In the case of not storing the information on this time's execution, the operation goes to the step S30. The execution information is stored and this process is terminated at the step S29. The execution information is deleted and this process is terminated at the step S30.

Next explained is operation in the case where the multifunction device 10 is connected to the external memory 22, which stores the execution information.

Figure 12:
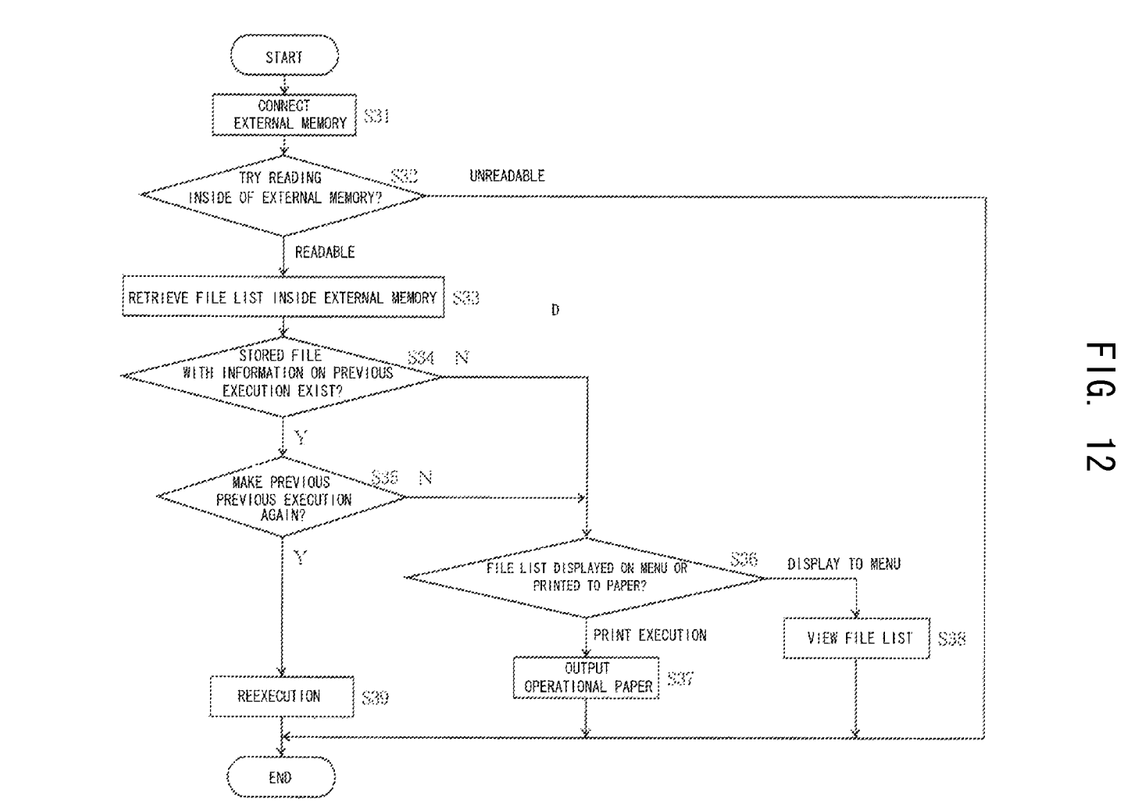
FIG. 12 is a flow chart showing operation of the multifunction device in a condition of being connected to an external memory storing execution information according to the second embodiment of this invention.

FIG. 12 is a flow chart showing operation of the multifunction device in a condition of being connected to the external memory storing execution information according to the second embodiment of this invention.

First, where the operator connects the external memory 22 that stores the execution information to the multifunction device 10, the multifunction device 10 detects that the external memory 22 is connected thereto. The data reading and writing unit 31 then tries reading the data inside the connected external memory 22, so that the controller 17 makes a judgment as to whether the data is readable by the multifunction device 10.

In the case of the unreadable data, the multifunction device 10 terminates the process without subsequent operation. Furthermore, in the case of the readable data, the data reading and writing unit 31 retrieves a file list inside the external memory 22.

A judgment is then made as to whether a file with the information on the previous execution exists. In the case of existence of the file with the information on the previous execution, that is, where the information on the previous execution is judged as being stored, upon detection of the specifically named file, the display unit 15 displays a message urging the operator to choose whether to make the previous execution again or not, and the operation is on standby until input is made by the operator through the input unit 13. In the case of choosing to make the previous execution again, the execution is made again based on the data stored in the external memory 22 to execute the operation from the step S21 to the step 30 automatically.

In the case where the file with the information on the previous execution does not exist and the previous execution is not made again, the display unit 15 displays the message urging the operator to choose whether to display the file list to a menu or to print the file list on the paper. Where the operator chooses the menu display only, that is, the operator chooses only to display the file list on the display unit 15, the file list displayed on the display unit 15 is reviewed and the process is terminated. Where the operator chooses to execute printing of the file list, the printing unit 14 prints the file list to the paper and outputs the operation paper, thereby terminating the process.

A flow chart will be explained next.

The external memory 22 is connected to the multifunction device 10 at the step S31. A judgment is made at the step S32 as to whether the data inside the external memory 22 can be read or not. In the case of the readable data in the external memory 22, the operation goes to the step S33. In the case of unreadable data in the external memory 22, the operation is terminated. The file list held by the external memory 22 is retrieved at the step S33. A judgment is made at the step S34 as to whether the stored file containing the information on the previous execution exists or not. In the case of existence of the stored file containing the information on the previous execution, the operation goes to the step S35. In the case of nonexistence of the stored file containing the information on the previous execution, the operation goes to the step S36. A judgment is made at the step S35 as to whether the previous execution is to be made again or not. In the case of making the previous execution, the operation goes to the step S39. In the case of not making the previous execution, the operation goes to the step S36. A judgment is made at the step S36 as to whether the file list is displayed on the menu or printed on the paper. In the case of displaying the file list on the menu, the operation goes to the step S38. In the case of printing the file list on the paper, the operation goes to the step S37. The operational paper is output and this process is terminated at the step S37. The file list is viewed and this process is terminated at the step S38. The previous execution is made again and this process is terminated at the step S39.

As described above, this embodiment enables a significant cut in the whole procedure in which the same procedure repeatedly occurs. Furthermore, in the case of existence of a similar model, operational information is stored in the similar model in advance, enabling execution of the same operation by a simple procedure, resulting in improved convenience.

The above embodiments describe examples of application to the multifunction device 10, but this invention can be applied to facsimile machines as long as the external memory 22 can be connected thereto. Furthermore, the above embodiments describe examples of application to equipment such as a USB memory which is used in direct connection, but this invention can be applied to a wireless LAN as long as a protocol enables two-way communication with the multifunction device 10.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. A multifunction device for executing processes according to execution request information, comprising:
   a reading unit for reading file list information stored in an external memory device;
   a printing unit for performing a printout on a printing medium upon associating a plurality of pieces of file identification information included in the file list information with printing executable processes information for each file identification information according to file type of the file identified by the file identification information on a one-to-one basis;
   a medium scanning unit for scanning the printing medium provided with execution request information thereon as image data;
   a detecting unit for detecting the execution request information from the scanned image data;
   an executing unit for executing a process corresponding to each of files stored in the external memory device, based on the detected execution request information;
   and an external memory device writing unit for, after executing processes at the executing unit, writing information identifying a file executed and information identifying the process executed with respect to the files as a stored file in the external memory device,
   wherein the executing unit executes again the process executed last time with respect to the file executed last time by referring the information in the stored file where the executing unit detects a request for re-executing the process executed last time and where the executing unit detects the stored file in the external memory device.

2. The multifunction device according to claim 1, wherein the processes are a printing process, a facsimile transmission process, an e-maile transmission process, and a process composed of a combination of any of the three processes.

3. The multifunction device according to claim 1, wherein the external memory device is an attachable external memory device.

4. The multifunction device according to claim 1, further comprising a specific file detecting unit for detecting the stored file.

5. The multifunction device according to claim 1, further comprising a unit for determining available executable processes, among the processes, corresponding to each of the files stored in the external memory device, based on the file list information.

6. The multifunction device according to claim 5, wherein the printing unit prints out on the printing medium the file list information and information on the determined available executable processes.

7. The multifunction device according to claim 5, further comprising a display unit for displaying the file list information and the information on the determined available executable processes.

8. The multifunction device according to claim 5, wherein the printing unit further prints out on the printing medium, a blank space for each of the determined available executable processes corresponding to each of the files stored in the external memory device, so that a check mark in the blank space for a particular process corresponding to a particular file indicates an execution request for the particular process with respect to the particular file,
wherein the medium scanning unit reads the printing medium provided with check marks in the blank space, and
wherein the detecting unit detects the execution request information on the provided check marks in the blank space.

9. The multifunction device according to claim 5, wherein the determining unit judges whether or not an executable process is available for execution with respect to each of the files, based on an identifier corresponding to each of the files, the identifier being included in the file list information.

10. The multifunction device according to claim 1, wherein the printing unit prints out on the printing medium by corresponding a file name of each file included in the file list information with the executable processes information with respect to each file.

11. The multifunction device according to claim 10, further comprising: a judging unit for judging the executable processes information with respect to each file based on an extension provided with each file included in the file list information.

12. A method for executing executable functions according to execution request information in a multifunction device, comprising the steps of:
reading file list information from an external memory device;
selecting an executable function based on the file information; performing a printout on a printing medium upon associating a plurality of pieces of file identification information included in the file list information with printing executable function information for each file identification information according to file type of the file identified by the file identification information on a one-to-one basis;
scanning the printing medium provided with execution request information thereon as image data;
detecting the file information and the provided execution request information from the scanned image data;
executing a process corresponding to the executable function based on the detected execution request information; and
after executing the process corresponding to the executable function, writing information identifying a file executed and information identifying the process executed with respect to the files as a stored file in the external memory device,
executing again the process executed last time with respect to the file executed last time by referring the information in the stored file where a request for re-executing the process executed last time is detected and where the stored file is detected in the external memory device.

13. A method for executing processes according to execution request information in a multifunction device, comprising:
reading file list information on files stored in an external memory device; performing a printout on a printing medium upon associating a plurality of pieces of file identification information included in the file list information with printing executable processes information for each file identification information according to file type of the file identified by the file identification information on a one-to-one basis;
scanning the printing medium provided with execution request information thereon as image data;
detecting the execution request information from the scanned image data;
executing a process corresponding to each of files stored in the external memory device, based on the detected execution request information; and
determining available executable processes, among the processes, corresponding to each of the files stored in the external memory device, based on the file list information, wherein:
a blank space is printed out on the printing medium for each of the determined available executable processes corresponding to each of the files stored in the external memory device, so that a check mark in the blank space for a particular process corresponding to a particular file indicates an execution request for the particular process with respect to the particular file,
the printing medium provided with check marks in the blank space is read, and the execution request information on the provided check marks in the blank space is detected.

14. The method according to claim 13, further comprising printing out on the printing medium the file list information and information on the determined available executable processes.

15. The method according to claim 13, further comprising displaying the file list information and the information on the determined available executable processes.

16. The method according to claim 13, wherein it is judged whether or not an executable process is available for execution with respect to each of the files, based on an identifier corresponding to each of the files, the identifier being included in the file list information.

* * * * *